United States Patent
Drasch et al.

(10) Patent No.: US 6,595,573 B1
(45) Date of Patent: Jul. 22, 2003

(54) BOW CONFIGURATION

(75) Inventors: Josef Drasch, Winzer (DE); Roger Remmel, Remscheid (DE)

(73) Assignee: Edscha LKW-Schiebeverdecke GmbH, Remscheid (DE)

( * ) Notice: Subject to any disclaimer, the term of this patent is extended or adjusted under 35 U.S.C. 154(b) by 0 days.

(21) Appl. No.: 09/856,564

(22) PCT Filed: Nov. 19, 1999

(86) PCT No.: PCT/DE99/03729

§ 371 (c)(1),
(2), (4) Date: May 23, 2001

(87) PCT Pub. No.: WO00/32429

PCT Pub. Date: Jun. 8, 2000

(30) Foreign Application Priority Data

Dec. 3, 1998 (DE) .......................................... 198 55 653

(51) Int. Cl.⁷ ............................... B60P 7/04; B60P 7/02
(52) U.S. Cl. ............. 296/118; 296/100.11; 296/100.17; 296/100.18
(58) Field of Search ............................ 296/118, 100.11, 296/100.12, 100.13, 100.15, 100.16, 100.17, 100.18

(56) References Cited

U.S. PATENT DOCUMENTS

| | | | | |
|---|---|---|---|---|
| 2,501,392 A | * | 3/1950 | Keller | 296/118 |
| 4,660,882 A | * | 4/1987 | Hensiek | 296/118 |
| 5,000,507 A | * | 3/1991 | Baxter | 296/118 |
| 5,005,896 A | * | 4/1991 | Li | 296/100 |
| 5,152,575 A | * | 10/1992 | DeMonte et al. | 296/100 |
| 5,301,995 A | * | 4/1994 | Isler | 296/100 |
| 5,538,313 A | * | 7/1996 | Henning | 296/100 |
| 5,556,156 A | * | 9/1996 | Kirk | 296/118 |

FOREIGN PATENT DOCUMENTS

| | | | |
|---|---|---|---|
| DE | 29700166 | 3/1997 | |
| EP | 0278198 | * 8/1988 | ............ 296/100.18 |
| EP | 0459879 | 12/1991 | |
| EP | 0885759 | 12/1998 | |
| FR | 2653478 | * 4/1991 | ............ 296/100.18 |
| GB | 2135259 | * 8/1984 | |
| GB | 2188882 | * 10/1987 | |
| GB | 2199549 | * 7/1988 | |

* cited by examiner

Primary Examiner—D. Glenn Dayoan
Assistant Examiner—H. Gutman
(74) Attorney, Agent, or Firm—Davidson, Davidson & Kappel, LLC

(57) ABSTRACT

The invention relates to a bow configuration for sliding convertible tops of vehicle constructions or containers with rigid or flexible bulkheads and sidewalls and to longitudinal belts being formed of profile rails and limiting the height of the configuration. A tarpaulin which goes over the top area of the configuration is supported by bows (1) which are arranged in predetermined, regular distances from each other and which span over the width of the loading area and which are supported at the longitudinal belts of the configuration. Said bows are supported at both ends horizontally as well as vertically by means of a roller trolley (5) or a corresponding roller arrangement which encompass the longitudinal belts at least partially. Said bows are guided in the longitudinal direction along complementary configured guide rails of the upper longitudinal belts of the construction. The aim of the invention is to provide for a bow configuration which allows to easily create single-piece bows of any form or size together with the necessary bearings for support rollers and guide rollers. It is also the aim of the invention to provide for a sufficient hardness of the areas of the bow which form the roller trolleys. To this end, the shaft of the bow (2) is configured as one piece together with the roller trolleys (5) which guide and support the shaft at both ends of the guide rails of the upper longitudinal belts of the configuration.

8 Claims, 4 Drawing Sheets

BOW CONFIGURATION

BACKGROUND OF THE INVENTION

The invention relates to a bow formation for folding tops which can be pushed together on vehicle bodies or containers having rigid or flexible end walls and side walls and upper longitudinal flanges which limit the height of the body upwards and are formed by profiled rails, wherein a tarpaulin which fits over the roof region of the body is supported by bows which are arranged at predetermined, uniform spacings from one another and span the width of the loading surface, said bows being supported on the longitudinal flanges of the body and supported at their two ends both in the horizontal and vertical directions in each case by means of a roller carriage which at least partially grips around the longitudinal flanges or by means of a corresponding roller arrangement, and are guided in a longitudinally displaceable manner on complimentarily designed guide tracks of the upper longitudinal flanges of the body.

Tarpaulin roofs are known in practice in which the roof tarpaulin is supported by bows which are not connected in an immovable manner to the frame of the vehicle body. The bows are basically used whenever at least occasional loading of the vehicle or container from above is required. In the case of the simplest known design of a tarpaulin roof of the abovementioned generic type for vehicle bodies or containers, the bows supporting the roof tarpaulin are connected to the upper longitudinal flanges of the vehicle body or of the container in such a manner that they can only be detached from the longitudinal flanges by being removed, and the tarpaulin has to be rolled up for the purpose of opening the tarpaulin roof. In such a form of design for a tarpaulin roof the bows can indeed be designed in a very simple manner, but the opening of the roof necessitates a considerable expenditure of energy and effort.

In the case of another design, which is known in practice, of tarpaulin roofs for vehicle bodies or containers, provision is made for the bows which support the roof tarpaulin to be supported at both ends via rollers or the like in a longitudinally moveable manner in guide-rail-like profiled forms of the upper longitudinal flanges of the frame of a vehicle body. Although tarpaulin roofs of this type are distinguished in that opening of the roof can be brought about relatively easily by pushing together the tarpaulin and bows, they are, on the other hand, affected by the disadvantage of a considerable outlay on production for the equipping of the bows with suitable rollers. This is true in particular if the roller arrangement in conjunction with the use of a commercially available profile material for the design of the upper longitudinal flanges of a vehicle body or of a container has to be designed in the form of a roller carriage, as is the case with most of the sliding folding tops which are currently customary.

One design, which is known in practice, of bows which are provided at both ends with a roller carriage for supporting and guiding in profiled rails makes provision for the bow to consist of a bow shaft, which is formed by a length section of a continuous hollow profile material, and of roller carriages connected to the said bow shaft at both ends, the roller carriages being prefabricated as independent units and being connected to the bow shaft. Although a design of this type involves the bows being less expensive, because of the possibility for decentralized production of the roller carriages and the simplicity of the connection thereof to the bow shaft, it is still affected by the outlay for assembling the bow which consists of a plurality of parts.

SUMMARY OF THE INVENTION

It is an object of the invention to provide a bow formation for tarpaulin folding tops or tarpaulin roofs of vehicle bodies or containers, which permits bows of any desired shape or size to be realized together with the required bearings for supporting and guide rollers, in particular roller carriages, as single-piece components at a very low outlay, and in which, moreover, sufficient strength is also ensured for the regions of a bow which form the roller carriages.

In the case of the bow formation mentioned at the beginning, this object may be achieved in that the bow shaft is designed as a single piece together with the roller carriages which guide and support it at both ends on the guide tracks of the upper longitudinal flanges of the body.

A bow formation of this type opens up the possibility of forming a bow in its entirety, i.e. together with a bow shaft and roller bearings, in particular roller carriages, from a simple hollow profile section and therefore of avoiding the conventionally required constructional outlay for assembling the bow.

A particularly suitable method of realizing bows which are designed as a single piece together with their bearings on the upper longitudinal flanges of the vehicle body resides in the fact that the bows consist of length sections of a hollow profile material of any desired profile cross section, the roller carriages which are arranged at the two ends of the said bows being formed by non-cutting deformation of the hollow profile material.

In a particularly preferred construction, provision is made for the hollow profile material in particular forming the shaft part of a bow to have a square or rectangular profile cross section and to be compressed in both end regions of a bow to form a double-layered flat material cross section and, in order to form a roller carriage, to be angled at least approximately perpendicularly with respect to the profile axis of the hollow profile material.

Excellent stability is achieved by the end regions of the bows, which end regions form roller carriages, compressed to form double-layered flat material cross sections and angled perpendicularly with respect to the profile axis of the hollow profile material, by the fact that the two wall regions of the hollow profile material which rest on each other in the region of each end, compressed to form a double-layered flat material cross section, of a hollow-profile-material section forming a bow are connected non-detachably to each other, preferably via means reaching through them, in particular rivet bolts. In order to obtain the desired stability, provision may also be made in accordance with the invention for the wall regions, which rest on each other, of the hollow profile material to be connected to one another non-detachably and non-displaceably relative to one another by the application of welding points or using another suitable joining method, but in the interests of the least possible outlay on production, provision is preferably made for the rivet bolts, which reach through the two wall regions, resting on each other, of each of the ends, compressed to form a double-layered flat material cross section, of a hollow-profile-material section forming a bow to be formed by the rivet bolts which are in any case required for connection of the bearings for the running or guide rollers of a roller carriage.

In a further refinement of the bow formation according to the invention, in order to increase the stability of the end regions of the bows forming the roller carriages, provision may furthermore be made for the angled portion of the end, compressed to form a double-layered flat material cross section, of a hollow-profile-material section forming a bow to include a bulge which is orientated as an extension of the longitudinal extent of the bow, and the double-layered flat material cross section to be provided in the region of its angled portion with an inwardly directed reinforcing bead.

Specifically, then, with a respective adaptation to the other characteristics of the folding top for which the bow is intended in each case, provision may further be made for the ends, compressed in each case to form a double-layered flat material cross section, of a hollow-profile-material section forming a bow to be provided with two running rollers rotating about axes orientated in an axially parallel manner to the bow shaft and with at least one guide roller rotating about an axis orientated perpendicularly with respect to the axis of the bow shaft.

In a further adaptation of the bow formation to particular formations of the folding top for which the respective bow is intended, provision may furthermore also be made for the ends, compressed in each case to form a double-layered flat material cross section, of a hollow-profile-material section forming a bow to form, as an extension of the bow surface, a fastening plane for bearing elements for a tarpaulin, which bearing elements connect adjacent bows to one another, the bearing elements consisting of a semi-rigid material, in particular of a plastic material reinforced locally, and being connected to the end regions of the bow by means of rivet bolts.

In this case, according to a further feature, the bow formation according to the invention is not exclusively limited to the provision of the bow with roller arrangements or roller carriages, but may likewise also be used with equally great advantage in conjunction with other forms of designing the bow support on the upper longitudinal flanges of a folding-top frame, in particular by the fact that the ends, compressed to form a double-layered flat material cross section, of a hollow-profile-material section forming a bow each form a bearing for a pair of struts supporting the bow against the guide tracks of the upper longitudinal flanges of the body.

Further advantages and features of the invention emerge from the following description and from the subclaims.

DESCRIPTION OF THE DRAWINGS

The invention is explained in greater detail below using a preferred exemplary embodiment of a bow formation according to the invention and by reference to the attached drawings.

DETAILED DESCRIPTION

Figure 1:
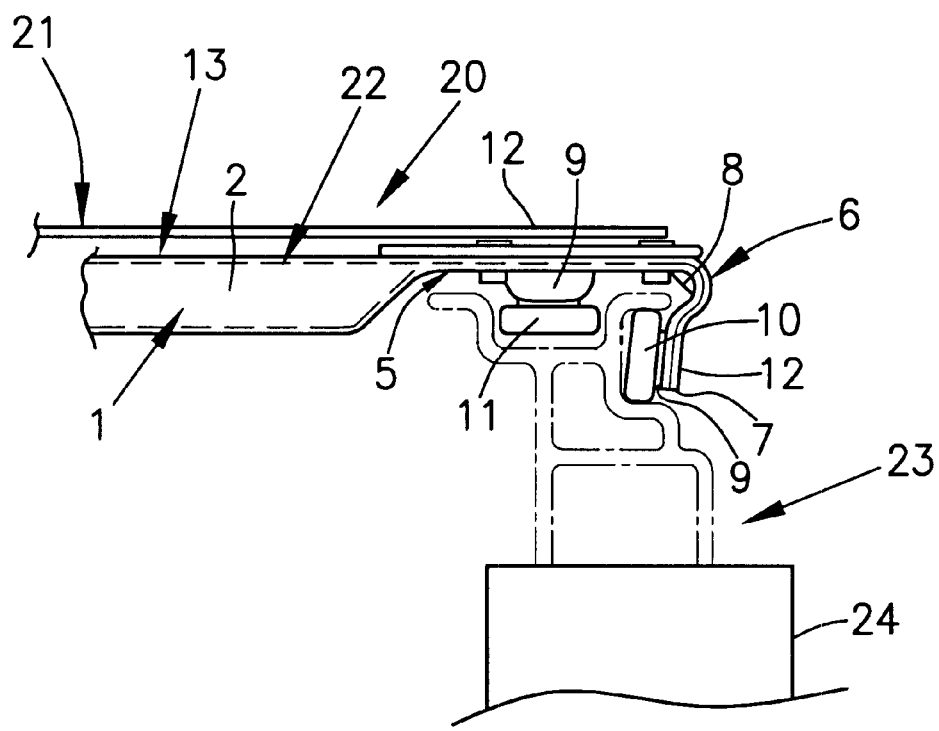
FIG. 1 shows a side view in sections of a bow provided with a roller carriage.
Figure 2:
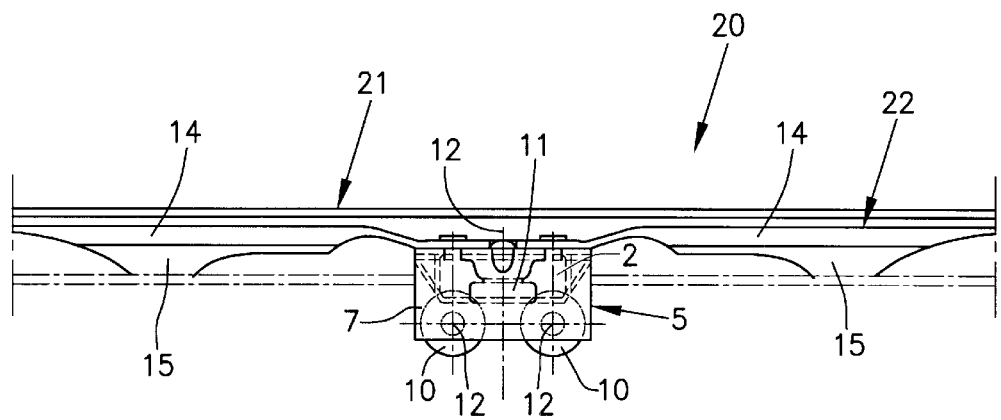
FIG. 2 shows an end view of the bow according to FIG. 1.
Figure 3:
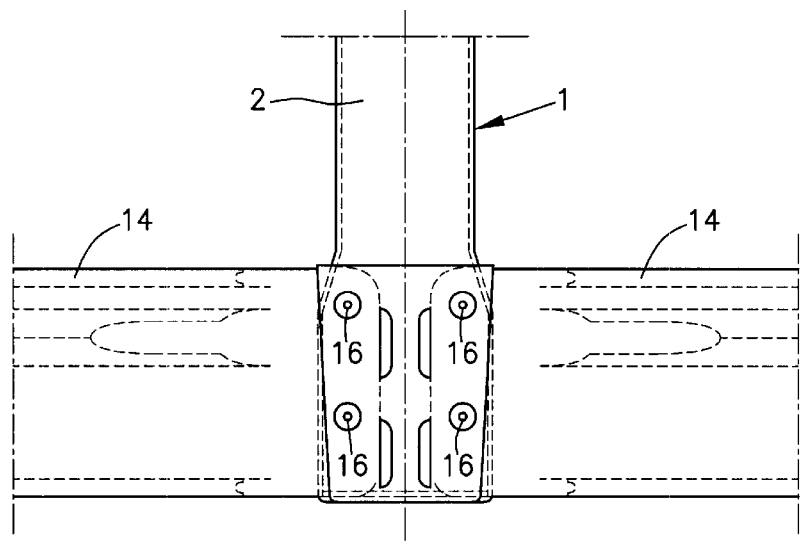
FIG. 3 shows a plan view of the bow according to FIGS. 1 and 2.
Figure 4:
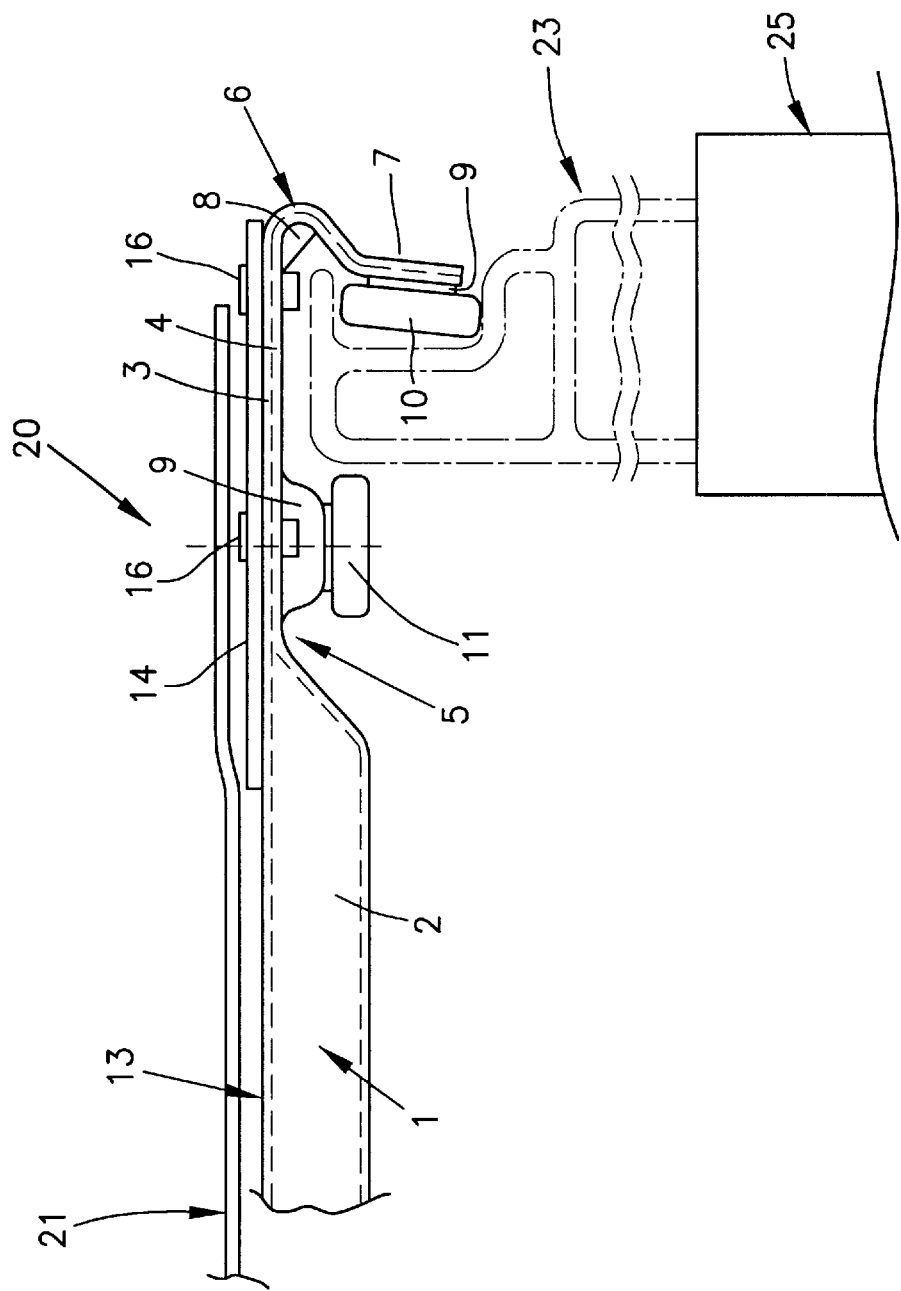
FIG. 4 shows a side view, likewise in sections, of a bow provided with a roller carriage, on an enlarged scale.
Figure 5:
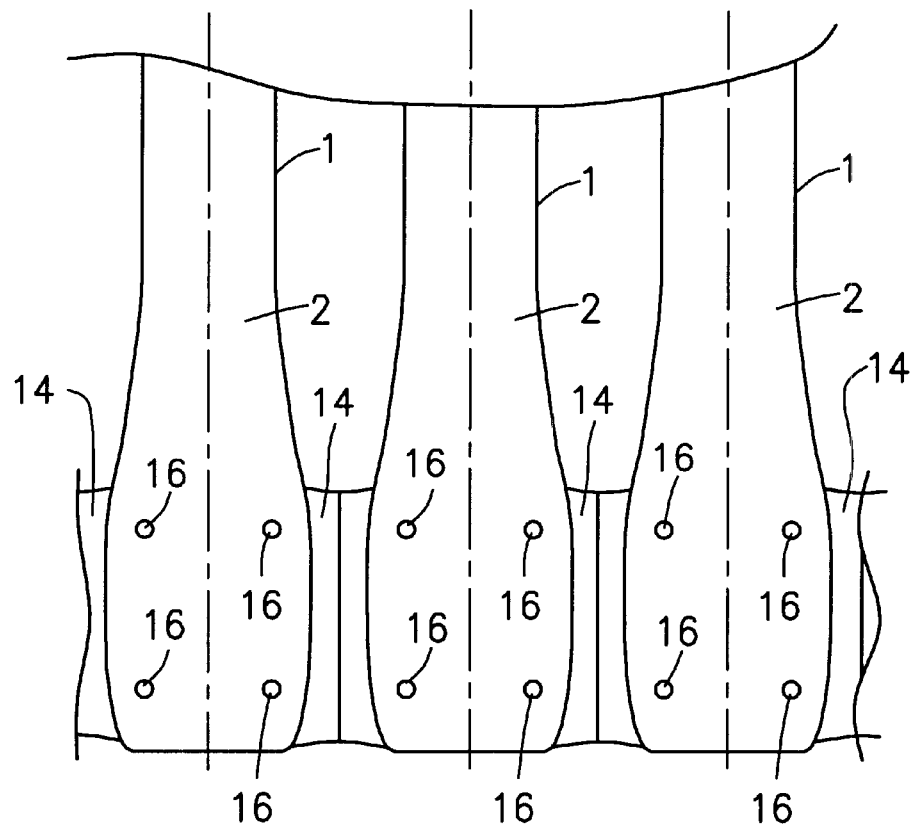
FIG. 5 shows a plan view of a portion of a folding top that is pushed together.

The bow 1 for a folding top 20 having a folding top body 23 for use on a container 25 (FIG. 4) or a vehicle body 24 (FIG. 1) of a vehicle is illustrated in sections in the drawing and in its entirety. The bow 1 is of mirror-inverted design for the purposes of the illustration, and is, as is indicated in particular in FIG. 1, produced from a single-piece length section of a hollow profile material having a rectangular profile cross section, in particular of a thin-walled hollow profile material of steel quality. The hollow profile material, which has a rectangular profile cross section and in this cross-sectional form forms the shaft part 2 of the bow 1, is, as can primarily be seen from the illustrations in FIGS. 1 and 4, compressed in the two end regions of the bow 1 to form a profiled shape which has two flat material regions 3 and 4 resting on each other. In its two end regions, which have a profiled shape characterized by two flat material regions 3 and 4 resting on each other, the bow 1 is angled essentially perpendicularly with respect to the profile axis of its shaft part 2 in order to form a roller carriage 5, where in order to increase the stability of the roller carriage 5 provision is made, in the embodiment shown, for the angled portion 7 of the ends, compressed to form a double-layered flat material cross section 3, 4, of the shaft part 2 to include a bulge 6 which is orientated as an extension of the longitudinal extent of the bow shaft 2, and for the double-layered flat material cross section 3, 4 to be provided in the region of its angled portion 7 with an inwardly directed reinforcing bead 8. In the embodiment shown, the wall regions 3, 4, resting on each other, of the hollow profile material are connected non-detachably and non-displaceably to one another by means of the rivet bolts 16 which reach through them and are in any case required for connection of the bearings 9 for the running rollers 10 and guide rollers 11 of the roller carriage 5, two running rollers 10 which rotate about axes 12 orientated in an axially parallel manner to the bow shaft and a guide roller 11 which is arranged at a distance from the running rollers and rotates about a vertical axis being provided. The ends, which are compressed in each case to form a double-layered flat material cross section 3, 4, of the hollow-profile-material section forming the bow shaft 2 are orientated as an (extension of the bow surface 13 and form a fastening plane for bearing elements 14 for a tarpaulin 21, which fits over a roof region 22 of the folding top 20, which bearing elements connect adjacent bows 1 to one another, the bearing elements 14 consisting of a semi-rigid material, in particular of a plastic material reinforced locally, in particular at 15, and being connected to the end regions of the bow 1 by means of rivet bolts 16. Folding top 20 can be opened by being pushed together. As shown in FIG. 5, bows 1 can be laterally moved (i.e. pushed together) sol as to reduce the distance between the bows 1, thereby deforming semi-rigid bearing elements 14, such as by bending or folding, and opening folding top 20.

What is claimed is:

1. A bow formation for a folding top body for use on one of a vehicle body and a container, said folding top body having side walls and upper longitudinal flanges, said upper longitudinal flanges limiting a height of the folding top body upwards, said upper longitudinal flanges being formed by profiled rails, wherein a tarpaulin fits over a roof region of the folding top body, comprising:

bows for supporting the tarpaulin, said bows including a bow shaft, wherein said bows are arranged at predetermined, uniform spacings from one another spanning the width of the roof region, and wherein said bows can be pushed together, wherein each of said bows includes a length section of a hollow profile material, said hollow profile material having a rectangular profile cross section and being compressed in each end to form a double-layered flat material cross-section and including an angled portion, the angled portion being angled substantially perpendicularly with respect to a profile axis of said hollow profile material so as to define a roller carriage, wherein said bows are supported in the horizontal and vertical directions by said roller carriage which at least partially grips around said longitudinal flanges, and wherein said roller carriage is supported on said longitudinal flanges and is guided in a longitudinally displaceable manner on guide tracks of said upper longitudinal flanges.

2. The bow formation according to claim 1, wherein a first flat material region and a second flat material region of said hollow profile material are in contact with each other and are connected to each other.

3. The bow formation according to claim 2, wherein said first flat material region and said second flat material region are connected via a rivet bolt, and wherein said rivet bolt at the same time forms a connection to a bearing for one of a running roller and of a guide roller of said roller carriage.

4. The bow formation according to claim 1, wherein said angled portion includes a bulge which is orientated as an extension of a longitudinal extent of one of said bows, and wherein the double-layered flat material cross section is provided in a region of said angled portion with an inwardly directed reinforcing bead.

5. The bow formation according to claim 1, wherein said double-layered flat material cross section is provided with two running rollers rotating about axes orientated in parallel to said profile axis and wherein said double-layered flat material cross section is provided with at least one guide roller rotating about an axis orientated perpendicularly with respect to said profile axis.

6. The bow formation according to claim 1, wherein the double-layered flat material cross section forms a fastening plane for at least one bearing element for said tarpaulin, wherein said at least one bearing element is configured to connect adjacent ones of said bows to one another, said at least one bearing element consisting of a semi-rigid material and being connected to said double-layered flat material cross section of said bows by a rivet bolt.

7. The bow formation according to claim 1, wherein the double-layered flat material cross section each form a bearing for a pair of struts supporting said bow against said guide tracks.

8. A commercial vehicle comprising a folding top which can be pushed together, comprising:

a body of said folding top;

upper longitudinal flanges which limit a height of said body upwards and comprise at least one guide track;

bows which are arranged at predetermined, uniform spacings from one another and span the width of the body, each of the bows having a bow shaft and two end portions; and a tarpaulin being supported on said bow shafts of said bows, wherein said bows include length sections of a hollow profile material of rectangular profile cross-section, wherein said hollow profile material is compressed at both end portions to form a double-layered flat material cross section, wherein at least a portion of said double-layered flat material cross section is angled substantially perpendicularly with respect to a profile axis of said hollow profile material for defining a roller carriage, wherein at least one roller is provided in said roller carriage, wherein said bows are supported in the horizontal and vertical directions by said roller carriage which at least partially grips around said longitudinal flanges, wherein said at least one roller is guided in a longitudinally displaceable manner on said guide track.

* * * * *